Nov. 18, 1930.    J. J. PONDELICEK    1,781,703
CUTTING MACHINE
Filed Nov. 14, 1922    6 Sheets-Sheet 2
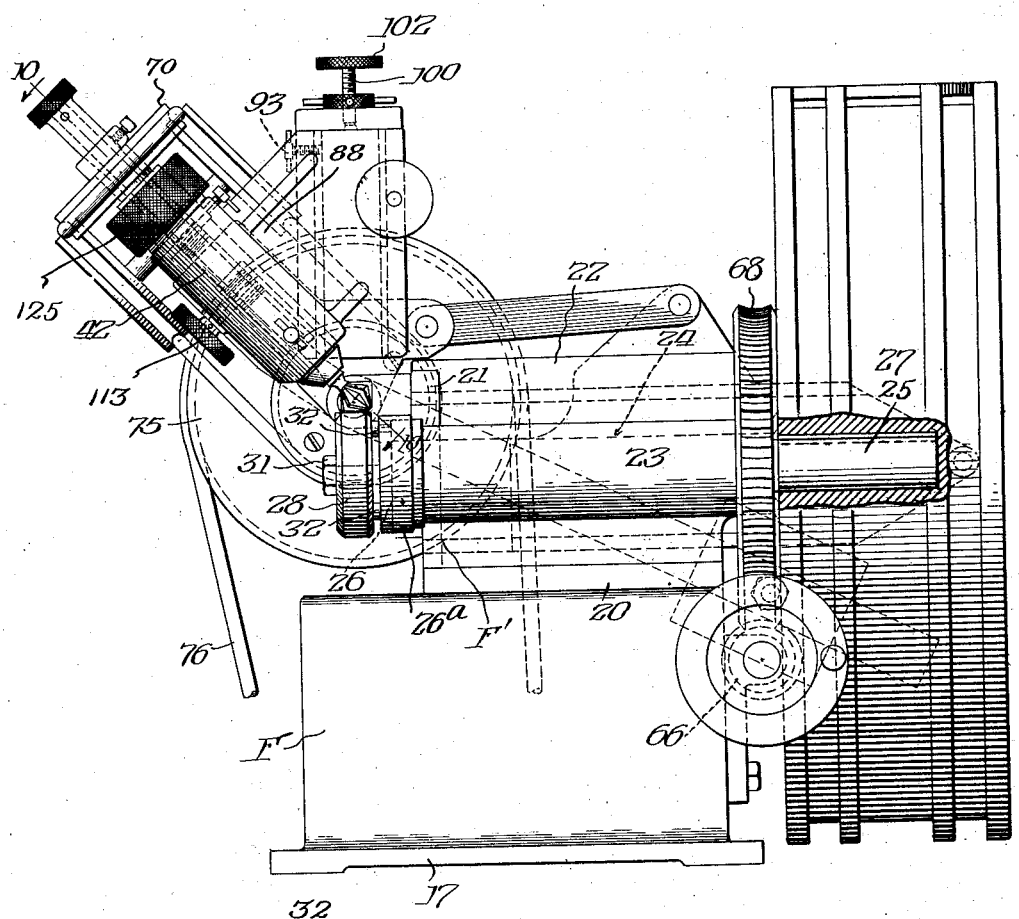
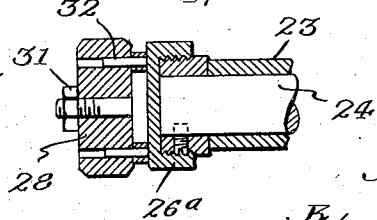
Inventor
Jerry J. Pondelicek

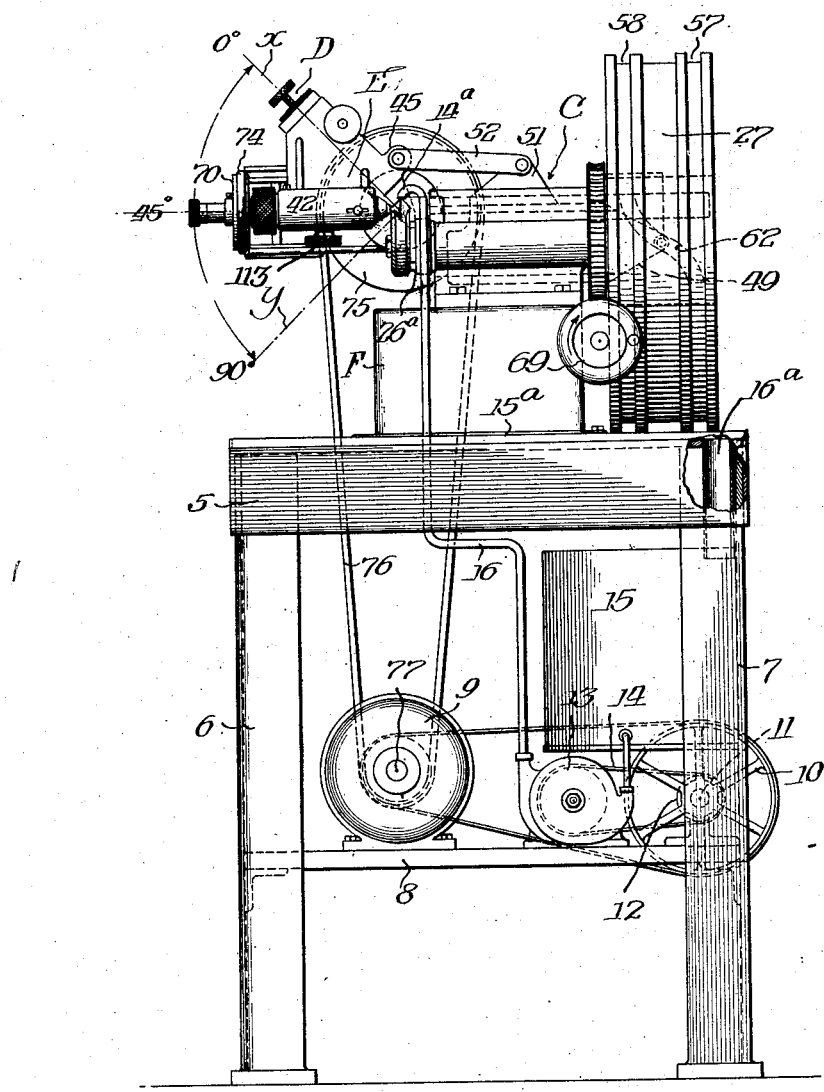

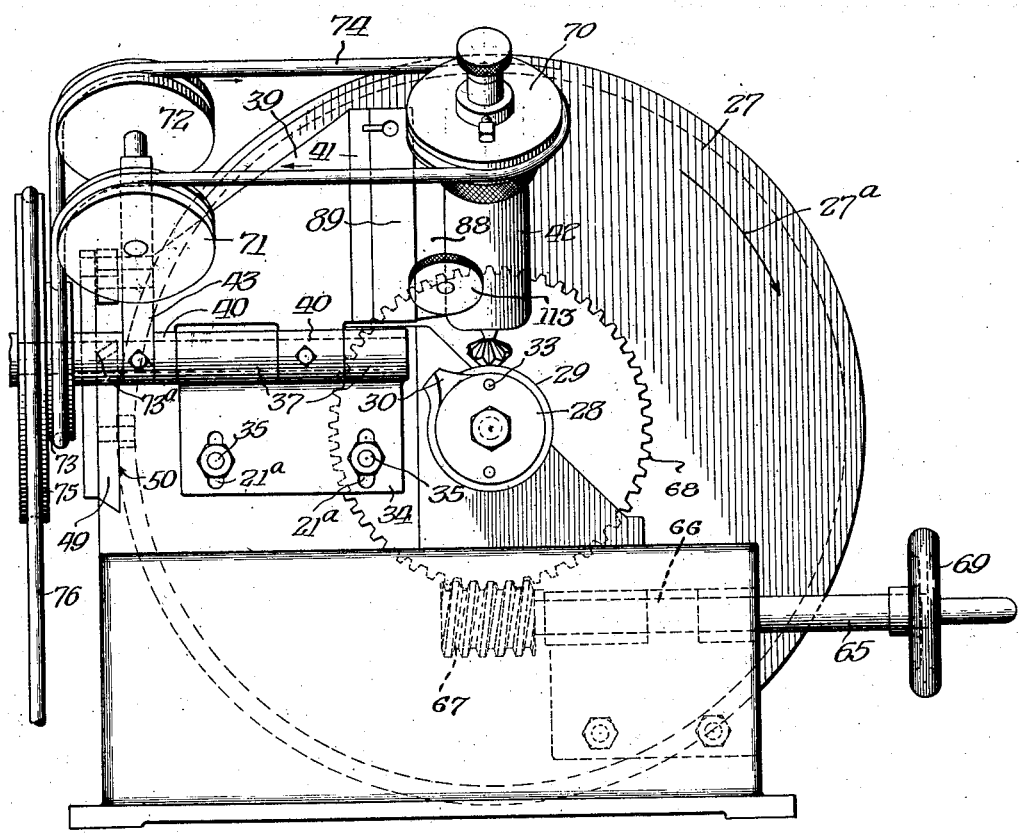

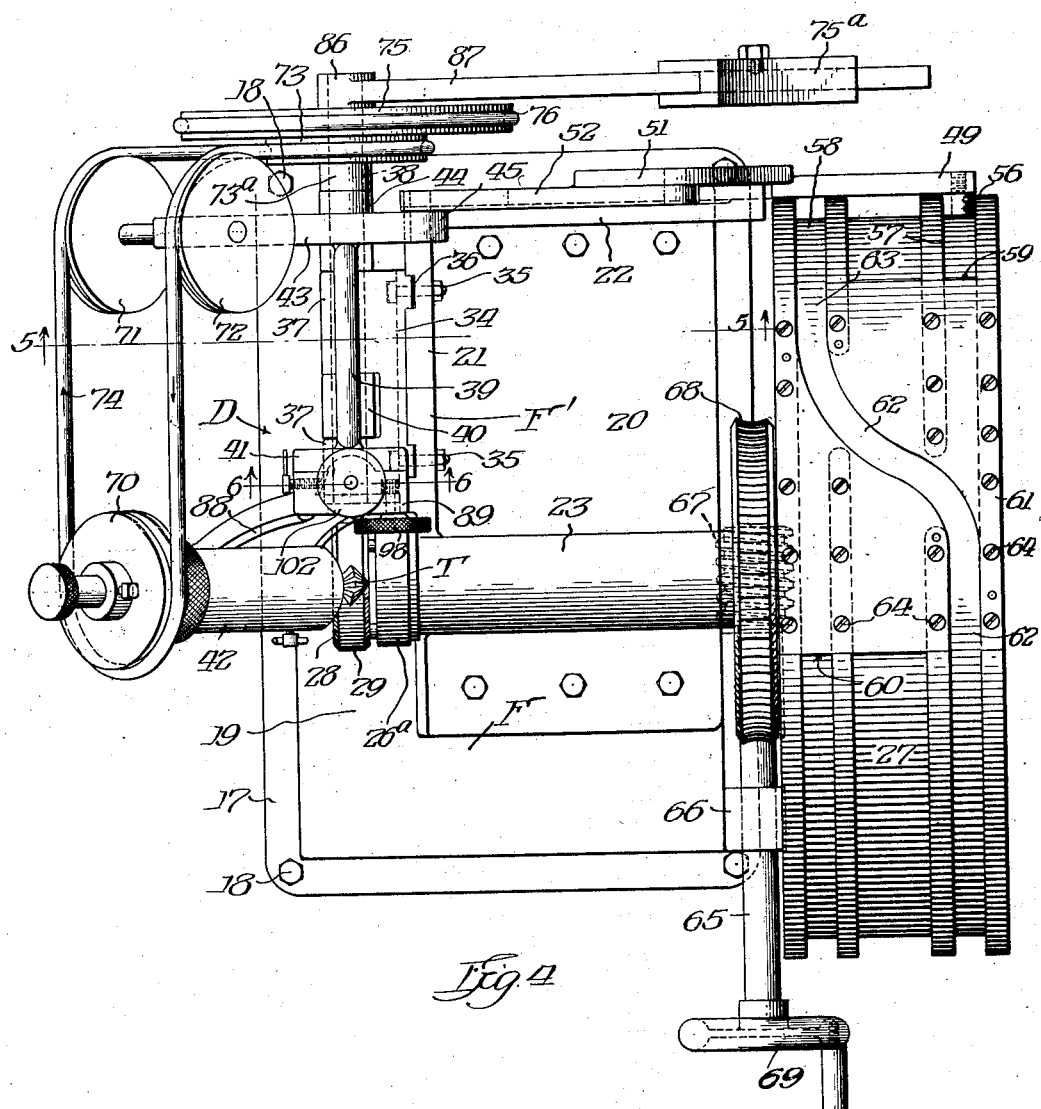

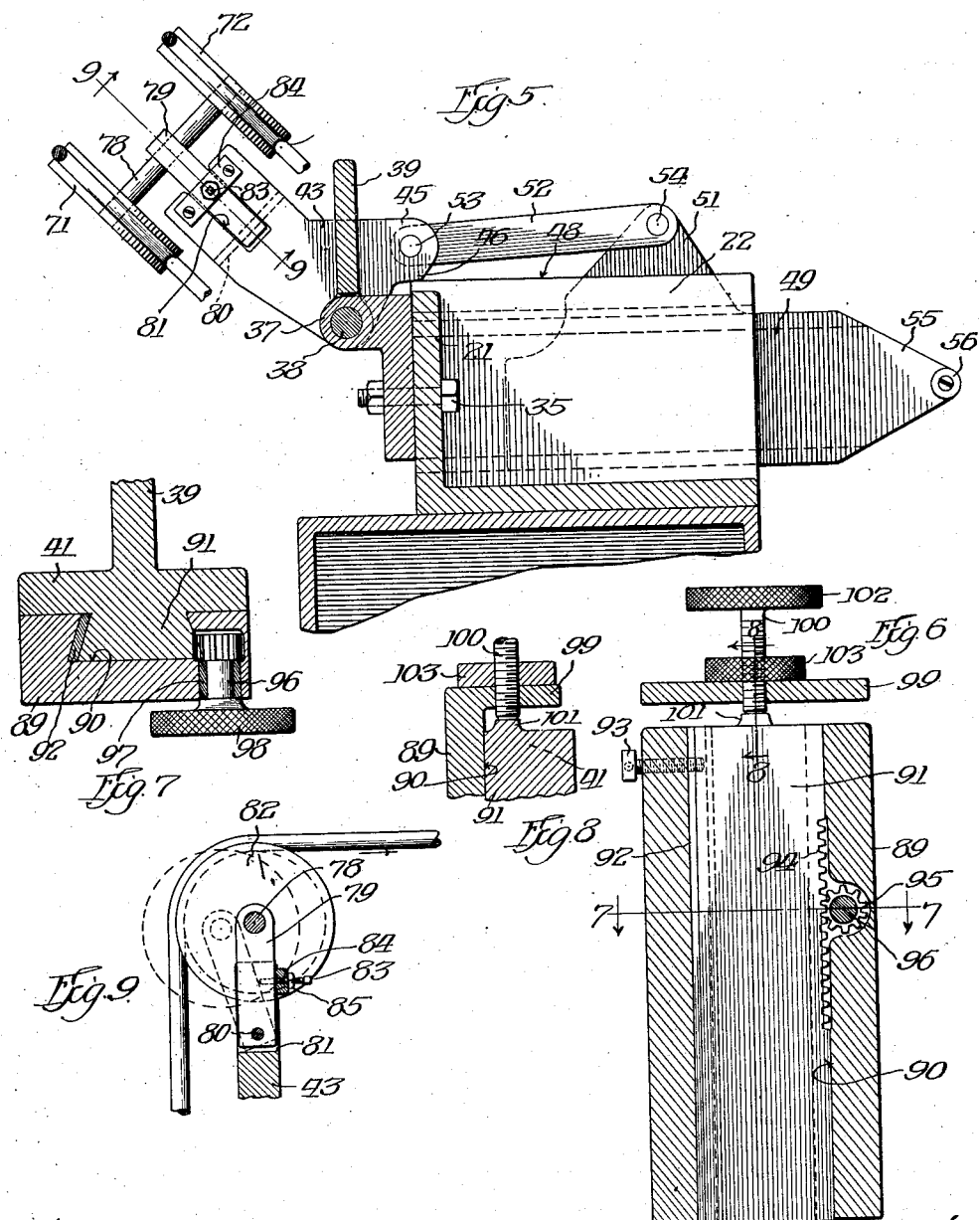

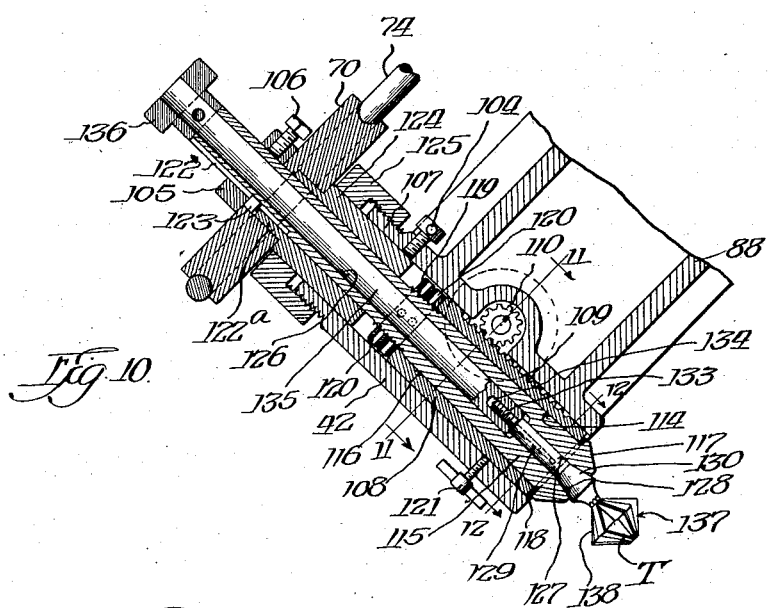
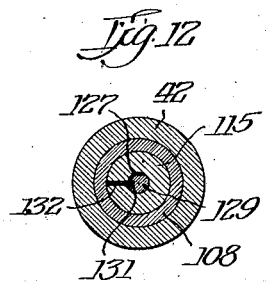
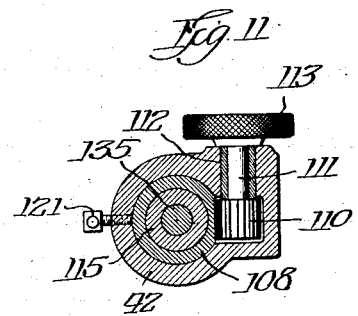
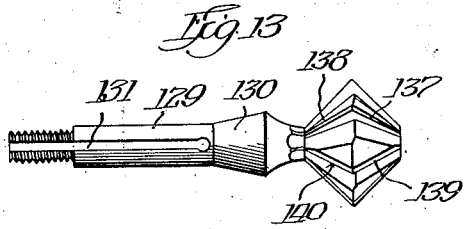
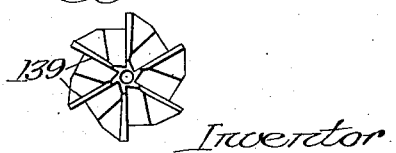

Patented Nov. 18, 1930

1,781,703

UNITED STATES PATENT OFFICE

JERRY J. PONDELICEK, OF CHICAGO, ILLINOIS, ASSIGNOR, BY MESNE ASSIGNMENTS, TO ACME MOTION PICTURE PROJECTOR COMPANY, OF CHICAGO, ILLINOIS, A CORPORATION OF ILLINOIS

CUTTING MACHINE

Application filed November 14, 1922. Serial No. 600,832.

This invention relates broadly to metal working and especially metal cutting and turning, more particularly to an improved apparatus for cutting metal or the like for constructing cams and other articles having special shapes.

While this invention, for the sake of convenience, is illustrated as embodying apparatus especially adapted for cutting a particular style and shape of cam, it will be readily understood that the invention is not limited to manufacture of this particular type of cam only, but finds a wide field of utility for other purposes.

The principal objects and advantages which characterize this invention reside in: the provision of an improved method of and apparatus for working metal; the provision of an improved method of and apparatus for working metal, which, while especially adapted for cutting cams in metal, may be employed equally as well for working other material; the provision of improved apparatus for cutting a special type or types of cam; the provision of improved apparatus for cutting a cam or series of cams, and in which the cutting mechanism is automatically controlled for depth and pitch of cam independently of the operator except for manual adjustment at start of cutting; the provision of improved apparatus which is characterized by the provision of improved means whereby a cutting tool may be set for cutting a cam of predetermined length and pitch, and which retains its adjustment throughout the manufacture of a number of such cams or other articles being made; the provision of improved cam cutting apparatus which is characterized by the provision of means permitting adjustment of the various parts whereby cams of various sizes, lengths and degrees of pitch may be made with the same tool; and the provision of a device possessing the characteristics pointed out above which is simple and compact in structure, readily portable, and highly flexible in operation.

The device of the present invention has been designed for the purpose of manufacturing accurately and rapidly in large quantities a special cam which forms the subject matter of my co-pending application Serial No. 592,400, but which cam is not, in detail, to be considered a part of the present invention; and to this end the apparatus hereinafter described and illustrated in the accompanying drawings includes means for supporting the work, or piece of metal on which the cam is made, an improved tool holder which is angularly displaceable relative the work for removing the requisite amount of material therefrom, or otherwise effecting the shape of the article worked upon, in order to produce thereon integral cam or cams possessing the desired characteristics; the provision of an improved pattern wheel from which the cam shape is determined; and the provision of an improved timing apparatus which may be modified as desired for producing the required relative movement between the cutting tool and the work; the provision of improved means for properly adjusting the tool for a "first cut", and for other necessary adjustments; and the provision of improved means for supplying lubricant to the tool and work; the operating mechanism of the device which controls the degree of relative motion between the work and the tool, being entirely automatic and operating independently of the control of the operator, so that the human element involved in the actual cutting of the cam, or other element being formed, is quite, if not entirely eliminated, thus making for speed and accuracy.

This invention is further characterized by the provision of means which permits of use of various sizes and shapes of cutting tools and controlling pattern elements, whereby cams and similar mechanical parts having various sizes, shapes and degrees of curvature, where curved, may be made with great speed and accuracy. Thus, this invention affords an improved apparatus for cutting metal or the like in a curved path while the metal is being displaced through another curved path, and the apparatus thus provided affords means for producing various articles in metal having special shapes.

The foregoing objects and advantages; together with such other objects and advantages as may hereinafter appear or be pointed out, are attained in one structural embodiment of this invention, illustrated in the accompanying drawings:

Figure 1 is a side elevational view of a metal cutting apparatus embodying the improvements of this invention;

Figure 2 is an enlarged fragmentary elevational view of the cutting mechanism and operating means therefor;

Figure 3 is an enlarged fragmentary end elevational view, viewing the machine from the aspect of the left hand end of Figure 1;

Figure 4 is a top plan view;

Figure 5 is an enlarged longitudinal vertical sectional view taken on the plane of the line 5—5 of Figure 4, looking in the direction indicated by the arrows;

Figure 6 is a longitudinal sectional view of a detail taken on the plane of the line 6—6 of Figure 4, looking in the direction indicated by the arrow;

Figure 7 is an enlarged sectional view of a detail taken on the plane of the line 7—7 of Figure 6;

Figure 8 is a sectional view taken on the plane of the line 8—8 of Figure 6;

Figure 9 is an enlarged sectional view taken on the plane of the line 9—9 of Figure 5, looking in the direction indicated by the arrow;

Figure 10 is an enlarged longitudinal sectional view of the tool holder taken on the plane of the line 10—10 of Figure 2, looking in the direction indicated by the arrows;

Figures 11 and 12 are transverse sectional views taken on the planes of the lines 11—11 and 12—12, respectively, of Figure 10, Figures 13 and 14 are side and end elevational views, respectively, on an enlarged scale, of the cutting tool, and Figure 15 is a detail sectional view of the work holder.

This invention, as structurally developed in the present embodiment, includes apparatus for driving a cutting tool having special characteristics to be hereinafter pointed out, means for imparting the proper amount of motion at a proper speed to the work, and means for displacing the cutting device angularly with respect to the work for performing certain operations thereon. The device illustrated in the accompanying drawings furthermore includes various adjustment features, whereby when cutting cams, various lengths of cam and degrees of pitch of the cam may be made.

Referring more particularly to the drawings, the apparatus of this invention includes the bench or platform 5, which affords a base upon which the cutting mechanism generally designated C is mounted, said base being supported on suitable pairs of legs 6 and 7. The legs 6 and 7 are arranged to support at a proper height, a platform 8, on which is mounted an electric motor 9, or the like, for driving the cutting mechanism, said motor being connected with a pulley 10 mounted on a shaft 11, a second pulley 12 also being mounted on said shaft. A centrifugal pump 13 is mounted on the platform 8, and said pump is driven by a belt 14 trained over the pulley 12. The centrifugal pump removes liquid lubricant contained in a tank 15 and forces such lubricant through a conduit 16 to a desired point on the cutting mechanism for lubricating the tool. A tray $15^a$ catches the used lubricant and conveys it through a tube $16^a$ to the tank 15.

The cutting mechanism and operating and control mechanism therefor are mounted upon a base frame F, which is provided with a bottom flange 17, secured to the platform 5 by the provision of bolts 18—18. The frame F is provided with a flat horizontal portion 19 forming the top thereof, and on said top 19, in a proper position, there is mounted a carrying frame F', which comprises the base portion 20, vertical web 21, guide web 22 at substantially right angles to the web 21, and bearing sleeve 23.

In the sleeve or bearing element 23 there is revolubly mounted a shaft 24, said shaft projecting beyond the ends of said sleeve as shown at 25 and 26, the projecting portion 25 having a cam wheel 27 fixedly secured thereto, and the portion 26 having a clutch head $26^a$ fixedly secured thereto. The work is seen at 28, Figures 1 to 4, inclusive, and the element here shown to be worked upon takes the form of a circular disk provided with a cylindrical surface 29 and interrupted by an enlargement 30, in which a special cam is to be cut.

While this apparatus may be employed for various purposes related to the art of metal turning and working, more particularly to the formation of special cams, it is here illustrated and described as employed in cutting cams similar to that described and claimed in my co-pending application Serial No. 592,400.

The disk 28 or other work is secured fixedly to the end 26 of the shaft 24. The clutch head $26^a$ is provided with parallel pins 32 which are adapted to engage in complemental openings 33 in the work, whereby to cause the work to rotate with the shaft 24. Of course, any other suitable clutch might be employed for this purpose.

The web 21 serves to support a hinge bracket 34, secured in position on said web by the provision of bolts 35—35, and tongue and groove connections 36. The tongue and groove connections prevent longitudinal displacement of the hinge bracket 34 of the web 21; and as the bracket 34 is slotted at $21^a$, it may be adjusted vertically on said web. The bracket 34 is provided with spaced coaxially apertured ears 37 adapted to receive a portion of a stationary shaft 38, which latter serves as a hinge pintle and also supports motion transmitting means hereinafter described.

The tool holding frame is generally designated D and comprises a single casting which is characterized by the provision of a web or bar 39 extending parallel to and longitudinally of the shaft 38, said web being provided with an apertured lug 40 for engagement with the shaft 38, and also serving to integrally connect a part 41 of an adjusting device, described later, and a bracket 43, the latter being arranged near the outer end of the shaft 38 and provided with a hub portion 44 adapted to axially receive the shaft 38. The tool holder 42 is carried by the part 41. The frame D is, thus, with the tool holder 42, adjusting device 41, and bracket 43, angularly displaceable on the web 21 for a purpose which will presently appear. The bracket 43 is provided with an extension 45, the latter having a shoulder 46 adapted to engage the top surface 48 of the guide web 22 for limiting the movement of the frame D in one direction.

The frame D, and the parts carried thereby, are angularly displaced by the provision of a cross-head 49 having a slidable mounting on the outer face of the guide web 22 and arranged against displacement therefrom by the provision of a dove-tail tongue and slot 50, as best seen in Figure 3. The cross-head 49 is provided with an upstanding lug 51, and a connecting rod or link 52 is pivotally connected at 53 and 54 with the extension 45 and lug 51.

The cross-head 49 extends beyond the end of the guide 22, across the peripheral face of the cam wheel 27, and said cross-head is reduced as at 55 and provided with an inwardly extended anti-friction roller 56, which latter is adapted to engage in peripheral grooves 57 and 58 provided on the cam wheel 27.

The grooves 57 and 58 are connected to form a single continuous groove having terminals at 59 and 60, respectively, by cutting away portions of the groove and inserting an arcuate plate section 61 provided with a sinuated groove 62, the ends of which latter join the grooves 57 and 58, as shown at 62 and 63, respectively, in Figure 4. The plate 61 is removably secured in proper position on the peripheral face of the wheel 27 by the provision of a plurality of series of machine screws 64—64.

It will be obvious that as the wheel 27 is rotated the cross-head 49 will be caused to reciprocate in its guide and thus angularly displace the frame D. It is intended that the plate 61 be readily removable so that it may be replaced by other plates having different shapes of grooves therein, but the arrangement shown provides for displacement of the frame D through an arc of 90 degrees.

Motion through a part of a revolution is imparted to the wheel 27 by the provision of a manually or otherwise rotatable shaft 65, arranged at right angles to the shaft 24, below the latter, in suitable bearings 66 on the frame F, said shaft 65 having a worm 67 which meshes with a worm gear 68, fixedly secured to the projecting end 25 of the shaft 24, between the wheel 27 and the adjacent end of the bearing 23. The outer end of the shaft 65 is provided with a hand wheel 69.

Referring now to the cutting mechanism and driving means therefor, there is provided the tool holder 42, in which the tool T is revolubly mounted, the detail structure of the tool holder and tool being described later. Motion is imparted to the tool in the proper direction by the provision of a pulley 70 axially mounted on the tool holder, idling pulleys 71 and 72, driving pulley 73, and a belt 74 trained over all of said pulleys. The pulley 73 is loosely mounted on the shaft 38 and is fixedly connected with a relatively large pulley 75 having a belt 76 trained thereover, which belt is also trained over a pulley mounted on the armature shaft 77 of the motor 9. The pulleys 73 and 75 are held against longitudinal displacement on shaft 38, by the provision of a sleeve 73ª, and the hub 86 of a counter-balance arm 87, which is fixedly secured to shaft 38. A weight 75ª is carried by the arm 87, and is adjustable thereon.

The pulleys 71 and 72 are carried indirectly by the bracket 43, said pulleys being mounted upon the extremities of a shaft 78 carried in the outer end of an arm 79 pivoted on a pin 80 which extends transversely through the bifurcated end of the bracket 43, said arm 79 being angularly adjustable in said bracket 43 for regulating the tension of the belt 74, by the provision of a bolt 83 which impinges upon one surface of the arm 79 and passes through a strap 84 secured to said bracket 43. A nut 85 retains the bolt in a position to which same has been moved.

Referring now to the tool holder and adjustable support therefor, I provide a single casting E including a supporting yoke 88, slide block 89 on said yoke, and the tool holder 42. The slide 89, as best shown in Figures 6, 7 and 8, is provided with a dove-tail slot or groove 90, which is adapted to receive the complemental tongue 91 formed on the bracket 41. A wearing and friction plate 92 is placed between one surface of the tongue 91 and the adjacent wall of the groove 90, and a set screw 93 passes through the block 89 and impinges upon said plate for locking the slide in an adjusted position. The opposite side wall of the tongue is provided with rack teeth 94, and a pinion 95 meshes with said rack. The pinion 95 is carried by a revoluble shaft 96 arranged in a bearing 97 in the block 89, and a knurled wheel 98 is fixed on the outer end of said shaft, whereby the latter may be rotated for sliding the block 89 in the support 41. In order to limit downward movement of the block 89, the latter is provided with an arm 99, which overlies the upper end of the support 41, said arm having a set screw 100 arranged therein for impinging upon the abutment 101 on the bracket 41. A knurled portion 102 serves for adjustment of the screw, and a nut 103 locks said screw. As the tool holder 42 is integral with or otherwise secured to the block 89, it is obvious that adjustment of said block results in similar adjustment of the tool holder.

The tool holder structure, which, of course, is exemplary of but one manner of obtaining the desired function and result, is best illustrated in Figures 10, 11 and 12. The tool holder comprises the preferably cylindrical hollow part 42, shown integral with the yoke 88, and provided with an outer reduced externally threaded portion 107. The cylinder 42 receives a longitudinally adjustable sleeve 108, said sleeve having rack teeth 109 meshing with a pinion 110. The pinion is fixed upon a shaft 111, revoluble in a bearing 112, and manipulated by the knurled nut 113, best seen in Figure 11.

The bore 114 of the sleeve 108 is tapered, with its larger diameter presented toward the tool T, and said sleeve receives the tool holding mandrel 115, which latter has a portion 116 of its external surface tapered to fit said sleeve 108. The mandrel 115 is provided with an enlarged head 117, said head abutting a wearing washer 118, placed between the head and the adjacent end of the sleeve 108. The mandrel is externally threaded at 119 and there receives two or more threaded lock and wear washers 120—120, which latter abut the inner end of the sleeve 108. The sleeve 108 is held against movement by the provision of a wing nut set screw 121, passing through the part 42 into engagement with said sleeve.

As will be seen from Figure 10, the enlarged head 117 and the nuts 120 cooperate to permit of rotation of the mandrel in the sleeve 108, but prevent longitudinal displacement of such mandrel. The mandrel projects through the outer end of the holder 42 and is provided with an external longitudinal key-way 122, the pulley 70 being mounted directly upon the mandrel 115, said pulley having its axial bore enlarged for reception of the reduced portion 122ª of the collar 124. The pulley is fixed for rotation with the mandrel 115 by the provision of a key 123, fitting in said key-way 122.

The adjusting collar 124 is receivable upon the mandrel, within the holder 42, and a knurled nut 125 is fixed to said collar by a press fit. The nut 125 engages the threaded part 107 of the holder 42 for adjusting said collar 124, and a set screw 104 holds the collar against movement when set. A collar 105 abuts the outer surface of the pulley 70 and a set-screw 106 holds said collar on the mandrel, the inner surface of the pulley abutting the collar 124.

The mandrel is provided with an axial bore 126, said bore being reduced at 127 and flared to form a socket at 128 for receiving the shank 129 and taper 130 of the tool T, respectively. As best seen in Figures 12 and 13, the tool shank has a longitudinal key-way 131 for reception of a key 132 fixed in the reduced part 127 of the mandrel bore, and the free end of the tool shank is threaded at 133 for engagement with an axial threaded opening 134 provided in one end of a tool locking rod 135, which latter lies in the bore 126 of the mandrel and has an external abutting nut 136. When the tool is inserted and engaged with the rod 135, the latter is rotated until the tool is firmly seated in the mandrel socket, the key 132 and said lock rod cooperating to prevent displacement of the tool.

The tool cutting head may, of course, take any suitable shape, depending upon the work to be done, but as here employed and as best shown in Figures 13 and 14 takes the form including two oppositely tapering cutting faces 137 and 138, composed of radially disposed blades 139 and 140, respectively. The blades 140 are, of course, continuations of the blades 139. The angularity of the two faces 137 and 138, with respect to the longitudinal axis of the tool, is preferably 45 degrees, but, of course, may be varied as required.

The tool holder 42, and the block 89 are so angularly related, that, when the block is vertically disposed, as seen in Figure 2, the tool holder is disposed at an angle of 45 degrees. The arrangement of the tool holder is also such that prior to or during a cutting operation, a center line passing transversely through the area of the work to be cut, or a transverse center line of the disk 28, extends exactly through the center of the tool cutting head. This can best be seen from an inspection of Figure 2.

As previously pointed out, the tool holder and the tool carried thereby are adapted to be angularly displaced, in the present embodiment, through an arc of substantially 90 degrees, and the limits of movement of the tool holder through its arc of displacement are indicated by the dotted lines X and Y, Figure 1. In this figure the tool holder is illustrated as in the medial position, that is, angularly displaced at about 45 degrees. At starting, the tool holder is disposed in a position shown in Figure 2, and in this position the center of the tool, center of the shaft 38, and a line drawn transversely through the center of the work all coincide as previously pointed out, so that the front cutting blades 139 have their cutting edges parallel to the cylindrical surface 29 of the work. The conduit 16 terminates in a downturned spout 14ᵃ just above the tool so that lubricant issuing from said spout is deposited upon the tool.

In operation, assuming that the machine is to be employed in making the special cam hereinbefore referred to, the work is secured to the shaft 24 as previously explained. Prior to this step, the cam wheel 27 has been provided with the proper grooved plate, in this instance, that previously described, and designated 61. As shown in Figures 2 and 4, the machine is ready for a cutting operation, the cross-head roller 56 being, at this time, disposed in the outer of the grooves on the cam wheel 27, namely the groove 57, near the terminus 59 thereof.

The tool T, having been placed in the tool holder, is brought into the proper position for cutting, namely, with its front cutting face in engagement with the face 29 of the disk 28 by properly adjusting the sleeve 108, nut 125, and collar 105. Further adjustment may be obtained by the vertical displacement of the block 89. This adjustment is had by releasing the block 89 so that the same may be operated by the knurled nut 98.

The tool holder being in the position shown in Figures 2 and 4, the set screws 121 and 106 are released, and by manipulation of the nut 113 the sleeve 108 is moved so as to bring the front cutting face 137 of the tool into proper engagement with the face 29 of the work.

This adjustment is permitted by virtue of the release of the collar 105 from engagement with the mandrel 115, and when the tool is in the proper position, the set screw 106 is again tightened so that the pulley 70 is maintained in abutting engagement with the collar 124. The set screw 121 is then tightened and the device is ready for cutting operation. The nut 125 permits of finer adjustment than that permitted by the rack and pinion structures 109 and 110. For instance, if the set screws 121 and 104 are released, and the nut 125 turned in either direction, the abutment collar 124 will be displaced in order to finely adjust the tool. The collar 105 is then adjusted to hold the pulley in proper running position against the abutment collar 125. Such adjustment, of course, displaces the pulley 70 slightly, but not sufficiently to cause the belt to leave the pulleys.

When the tool has been properly adjusted and the holder secured in proper adjusted position by tightening the set screws 121 and 104, the entire holder may be vertically displaced by manipulation of the nut 98, so that when taking a first cut off the work, that is, when first removing a part of the enlargement 30, or when working a deep cut in the work, the tool may be lifted to the top of the enlargement and the motor started so that a first cut will be taken from the top portion of the enlargement 30. After a sufficient amount of material has been removed from the enlargement 30 so that the tool will not jam, the nut 98 is manipulated to bring the tool back to its previous position, and the set screw 93 is then tightened.

The motor 9 is again started, and the tool, revolving at a rapid rate, is introduced into engagement with the enlargement 30 by imparting motion manually to the hand wheel 69 in the direction of the arrow shown in Figure 1. This motion performs two functions, namely, produces a circular displacement of the work and the enlargement 30 past the tool T, and simultaneously imparts rotation to the cam wheel 27 in the direction of the arrow 27ᵃ, Figure 3, thus causing relative movement between the groove 57 and the roller 56. Continuation of rotation of the cam wheel through a complete double revolution, that is, one revolution through the groove 57, then transfer of the roller to the groove 58, and one revolution in the latter groove, produces reciprocation of the cross-head 49, and consequently displacement of the frame D through 90 degrees. This means that the tool holder 43 is displaced from the position shown in Figure 2, through the position shown in Figure 1, to the point indicated by the dotted line Y, in Figure 1. Rotation of the work and displacement of the tool are so timed that the tool commences to move from the position shown in Figure 2 simultaneously with the arrival at the tool of the enlargement 30.

The angular displacement of the tool holder and the frame D is accomplished against the action of the weight 75ᵃ, and consequently the motion of the frame is balanced. Furthermore the weight facilitates the return of the tool holder to normal position, and permits of a reverse cut being made. It will be readily observed that in some instances the cam to be formed on the disk 28 may be produced by one operation of the tool, but where the cut required in making the cam is too deep for one operation, the machine may be put through two or more cutting steps, each step making a slightly deeper cut in the enlargement 30. This may be accomplished by manipulating the block 89 for each cut, and it will be observed that by reversing the direction of rotation of the wheel 69 and by lowering the tool for each oscillation, a cut may be made when moving the tool holder downwardly and another cut may be made as the tool holder returns to normal position.

By placing plates having different curvatures of grooves on the cam wheel 27, or by placing two or more of such plates on the wheel 27, I am enabled to form a series of cams on the work, and these cams may be placed either regularly or irregularly about the disk 28. Of course, the forging from which the cam disk is made is provided with the required number of enlargements. Furthermore, by placing two or more plates, similar to that designated 61, upon the wheel 27, but with grooves relatively reversed, I am enabled to form cams in series upon the disk, said cams being relatively reversed, or if desired, the cams may have relatively different pitches. For instance, it may be desired to produce a cam disk having two or more sets of cams thereon which are adapted to impart motion in the same direction and at relatively different speeds, which requires cams having different pitches, or if desired, the series of cams may be arranged in sets of two or more, and the units of each set may have the same or different pitches and may be constructed to impart motion in the same or different directions when in use. Thus, it will be readily observed that I do not limit this invention to the production of any specific size, shape, or pitch of cam, and that all the features referred to may be carried out without in the least modifying the basic method of operation of the device. In fact, the tool shown is entirely adequate for forming cams of different pitches, but could be replaced by a larger or smaller tool where the sizes of the cams are different.

Having thus described my invention and illustrated its use, what I claim as new and desire to secure by Letters Patent is:—

1. In a device of the character described, in combination, means for rotating an object to be worked upon, a cutting tool, and means for initially applying a cutting tool in a plane substantially tangentially to the periphery of said object and in a plane radially of such object, said means operating to displace the tool relatively to the object in a curved path during cutting and without disturbing the radial relationship of the tool and object.

2. In a device of the character described, in combination, a work support, and an object thereon adapted to be rotated, and a tool holder which is angularly displaceable with respect to the object about a center point located within the confines of the periphery of the object rotated, and a tool having its working surface entering said periphery.

3. In a device of the character described, in combination, a work support, and an object thereon adapted to be rotated, and a tool holder which is angularly displaceable with respect to the object about a center point located within the confines of the periphery of the object rotated, and a tool having its longitudinal axis disposed in a plane radial with respect to said object and having its working surface entering said periphery.

4. In a device of the character described, in combination, a work support, and an object thereon adapted to be rotated, and a tool holder which is angularly displaceable with respect to the object about a center point located within the confines of the periphery of the object rotated and an automatically angularly displaceable tool having its working surface entering said periphery.

5. In a device of the character described, in combination, a work support, and an object thereon adapted to be rotated, and a tool holder which is angularly displaceable with respect to the object about a center point located within the confines of the periphery of the object rotated, a tool having its working surface entering said periphery, and means for adjusting said tool on its longitudinal axis without substantially disturbing its angular relationship to such periphery.

6. In a device of the character described, in combination, a revoluble tool, said tool having a plurality of contiguous cutting faces angularly related, and means for angularly displacing said tool for presenting first one and then another of said faces in succession by a continuous motion to an object to be cut.

7. In a device of the character described, in combination, a tool having an angular cutting head and adapted to be revolved, and means for presenting said tool continuously in contact with an object to be cut and for simultaneously angularly displacing said head with respect to said object about a center located in the periphery of said object.

8. In a device of the character described, in combination, a revoluble tool having an angular cutting head, and means for presenting the faces and corners of said tool to an object to be cut.

9. In a device of the character described, in combination, a revoluble tool having an angular cutting head, and means for successively presenting the faces and corners of said tool to an object to be cut.

10. In a device of the character described, in combination, a revoluble tool having an angular cutting head, and means for presenting one of the faces of the tool and then an angular portion of the tool to an object to be cut.

11. In a device of the character described, in combination, an object to be cut, a tool having an angular cutting head, means for presenting said tool continuously in contact with said object and for simultaneously displacing the tool about a center located in said object, and means for simultaneously rotating said object with respect to the tool.

12. In a device of the character described, in combination, an object to be cut, a tool having an angular cutting head, means for presenting said tool continuously in contact with said object and for simultaneously displacing the tool about a center located in said object, and means for simultaneously at a given ratio of speed rotating said object in a curved plane.

13. In a device of the character described, in combination, a revoluble tool having an angular cutting head, and means for presenting the faces and corners of said tool to an object to be cut while in continuous working contact with such object.

14. In a device of the character described, in combination, a work holder, a tool holder disposed normally in a plane radially disposed with respect to the axis of said work holder, and means for angularly displacing said tool holder in such a plane without disturbing the radial distance between cutting head of the tool carried by said tool holder and the axis of said work holder.

15. In a device of the character described, in combination, a tool provided with a cutting head having oppositely tapered cutting faces, and means for concurrently presenting both of said faces to an object to be cut.

16. In a device of the character described, in combination, a tool provided with a cutting head having oppositely tapered cutting faces, and means for angularly displacing the tool presenting one and then the other of said faces to an object to be cut.

17. In a device of the character described, in combination, a tool provided with a cutting head having oppositely tapered cutting faces, and means for presenting said cutting faces successively and without interruption to an object to be cut.

18. In a device of the character described, in combination, a rotatable work holder, a pattern rotatable on an axis coincident with said work holder, said work holder being adapted to support an object to be worked upon, a tool holder arranged with its axis initially parallel to the axis of said work holder, a tool supported by said tool holder and having its cutting surface engaging the periphery of the work carried by said work holder and means for displacing said tool holder angularly with respect to the axis of said work holder in a plane radially thereof.

19. In a device of the character described, in combination, a rotatable work holder, a pattern rotatable on an axis coincident with said work holder, said work holder being adapted to support an object to be worked upon, a tool holder arranged with its axis initially parallel to the axis of said work holder, a tool supported by said tool holder and having its cutting surface engaging the periphery of the work carried by said work holder and means for displacing said tool holder angularly with respect to the axis of said work holder in a plane radially thereof, said means being operated by said pattern.

20. In a device of the character described, in combination, a rotatable work holder, a pattern rotatable on an axis coincident with said work holder, said work holder being adapted to support an object to be worked upon, a tool holder arranged with its axis initially parallel to the axis of said work holder, a tool supported by said tool holder and having its cutting surface engaging the periphery of the work carried by said work holder and means for displacing the work holder including a reciprocating member operable in a path parallel to the axis of said work holder and connected to be operated by said pattern.

In testimony whereof I have hereunto signed my name.

JERRY J. PONDELICEK.